United States Patent
Stanforth

(10) Patent No.: US 9,066,238 B2
(45) Date of Patent: Jun. 23, 2015

(54) SYSTEM AND METHOD FOR SPECTRUM SHARING AMONG PLURAL WIRELESS RADIO NETWORKS

(75) Inventor: Peter Stanforth, Winter Springs, FL (US)

(73) Assignee: Spectrum Bridge. Inc., Lake Mary, FL (US)

( * ) Notice: Subject to any disclaimer, the term of this patent is extended or adjusted under 35 U.S.C. 154(b) by 854 days.

(21) Appl. No.: 12/709,557

(22) Filed: Feb. 22, 2010

(65) Prior Publication Data

US 2011/0205941 A1     Aug. 25, 2011

(51) Int. Cl.
*H04W 72/04* (2009.01)
*H04W 16/14* (2009.01)
*H04W 4/06* (2009.01)
*H04W 92/02* (2009.01)

(52) U.S. Cl.
CPC .......... *H04W 16/14* (2013.01); *H04W 72/0466* (2013.01); *H04W 4/06* (2013.01); *H04W 92/02* (2013.01)

(58) Field of Classification Search
CPC ............................. H04W 16/14; H04W 16/16
USPC ......... 370/335, 336, 342–348, 436, 441, 442, 370/478, 479, 480, 498; 455/454
See application file for complete search history.

(56) References Cited

U.S. PATENT DOCUMENTS

| | | | |
|---|---|---|---|
| 5,608,727 A | 3/1997 | Perreault et al. | |
| 5,729,531 A | 3/1998 | Raith et al. | |
| 7,110,756 B2 | 9/2006 | Diener | |
| 7,349,880 B1 | 3/2008 | Kitao | |
| 7,460,837 B2 | 12/2008 | Diener | |
| 2004/0087310 A1 | 5/2004 | Williamson et al. | |
| 2006/0031082 A1 | 2/2006 | Amaitis et al. | |
| 2006/0056376 A1* | 3/2006 | Terry et al. | 370/342 |
| 2006/0083205 A1 | 4/2006 | Buddhikot et al. | |
| 2006/0143111 A1 | 6/2006 | Mylet | |
| 2006/0160543 A1 | 7/2006 | Mashinsky | |
| 2006/0218392 A1 | 9/2006 | Johnston | |
| 2006/0262768 A1 | 11/2006 | Putzolu | |
| 2007/0106596 A1 | 5/2007 | Bayyapu et al. | |
| 2007/0274404 A1 | 11/2007 | Papandriopoulos et al. | |
| 2008/0052387 A1 | 2/2008 | Heinz et al. | |
| 2008/0108365 A1 | 5/2008 | Buddhikot et al. | |
| 2008/0183634 A1 | 7/2008 | Sadler | |
| 2008/0221951 A1 | 9/2008 | Stanforth et al. | |
| 2008/0222019 A1 | 9/2008 | Stanforth et al. | |
| 2008/0222021 A1* | 9/2008 | Stanforth et al. | 705/37 |
| 2008/0253341 A1* | 10/2008 | Cordeiro et al. | 370/338 |
| 2008/0268892 A1 | 10/2008 | Hamdi et al. | |
| 2009/0017761 A1 | 1/2009 | Li et al. | |
| 2009/0034554 A1 | 2/2009 | Evans et al. | |
| 2009/0040972 A1* | 2/2009 | Robson et al. | 370/329 |

(Continued)

OTHER PUBLICATIONS

Kwerel, Evan et al., "A Proposal for a Rapid Transition to Market Allocation of Spectrum", Federal Communications Commission, 2002, OPP Working Paper No. 38, pp. 1-50.

(Continued)

*Primary Examiner* — Pao Sinkantarakorn
(74) *Attorney, Agent, or Firm* — Tucker Ellis LLP

(57) ABSTRACT

Spectrum that overlaps in time, geography and frequency is allocated to more than one radio network. The networks share the spectrum by employing spectrum sharing in accordance with spectrum sharing control data to avoid collisions between the transmissions of the networks.

8 Claims, 2 Drawing Sheets

(56) References Cited

U.S. PATENT DOCUMENTS

| | | | |
|---|---|---|---|
| 2009/0046625 A1 | 2/2009 | Diener et al. | |
| 2009/0131014 A1 | 5/2009 | Mashinsky et al. | |
| 2009/0197627 A1 | 8/2009 | Kuffner et al. | |
| 2009/0312028 A1 | 12/2009 | Burchfiel | |
| 2010/0111042 A1* | 5/2010 | Chou et al. | 370/332 |
| 2011/0021153 A1* | 1/2011 | Safavi | 455/63.1 |

OTHER PUBLICATIONS

By the Commission, "Second Report and Order, Order on Reconsideration, and Second Further Notice of Proposed Rulemaking", Federal Communications Commission, 2004, FCC 04-167, WT Docket No. 00-230, pp. 1-180.

McKnight, Lee et al., "Best Effort versus Spectrum Markets: Wideband and Wi-Fi versus 3G MVNOs?", pp. 1-18, Year 2001.

Prabhu, Krish et al., "Time for Action" Genuine Ideas, 2002, [retrieved online Feb. 1, 2008], <http://www.genuineideas.com/ArticlesIndex/TimeForAction.htm>.

FCC 08-260, Second Report and Order and Memorandum Opinion and Order, Adopted Nov. 4, 2008 and Released Nov. 14, 2008.

"Digital Dividend: Cognitive Access, Consultation on License-Exempting Cognitive Devices using Interleaved Spectrum", Ofcom, Publication Date: Feb. 16, 2009.

U.S. Spectrum Management Policy: Agenda for the Future, 1991.

Radio Spectrum Management, Module 5 of ICT Regulation Toolkit, ITU, 2007.

Jones, Steven K. et al., "Initial Evaluation of the Performance of Prototype TV-Band White Space Devices", (2007), OET Report, FCC/OET 07-TR-1006.

47 C.F.R. 15.713, Year : 2012.

* cited by examiner

SYSTEM AND METHOD FOR SPECTRUM SHARING AMONG PLURAL WIRELESS RADIO NETWORKS

TECHNICAL FIELD OF THE INVENTION

The technology of the present disclosure relates generally to wireless communications infrastructure and, more particularly, to a system and method for facilitating the simultaneous use of spectrum for wireless communications by more than one network or group of wireless devices.

BACKGROUND

Wireless networks and systems are becoming increasingly popular. But wireless communications are constrained due to a lack of available, interference free spectrum that may be used for reliable communications within a geographic area.

To enhance the availability and reliability of interference free spectrum, procedures that are governed by regulatory agencies (e.g., the Federal Communications Commission (FCC) in the United States) have been developed for allocating and using spectrum. In the U.S., for example, there are two general classes of spectrum, including licensed spectrum and unlicensed spectrum. With respect to the licensed spectrum, the FCC licenses spectrum in a primary spectrum market to Commission licensees. A secondary market exists for the Commission licensees to sublease spectrum for use by other parties. With some narrow exceptions (e.g., government priority rights), licensed spectrum is exclusively reserved for the corresponding Commission licensee and any subleasee(s).

Unlicensed spectrum may be used without a license and by virtually any party, but regulations on the spectrum may be imposed. Exemplary unlicensed spectrum includes industrial, scientific and medical (ISM) bands and information infrastructure (UNII) bands. These bands are open to all users provided the users comply with certain regulations. In the U.S., these regulations are known as FCC Part 15. Traditionally, these bands have been used for microwave ovens, cordless phones, low powered wireless remote controls, and similar devices. Recently, with the advent of IEEE 802.11 (commonly known as WiFi), these bands have become very popular for computer communications and mobile data communications activities, as well as for point-to-point and point-to-multipoint applications. As the number of installations and users of these applications has increased the unlicensed ISM and UNII spectrum bands have become very crowded.

Other unlicensed spectrum includes spectrum that has been freed by the conversion of analog television (TV) broadcasts to digital TV broadcasts. This conversion has freed spectrum channels for use by unlicensed radio systems to offer various services, such as mobile communications and Internet access. The available spectrum bands are commonly referred to as TV white spaces, which are made up of the guard bands and unused TV channels between channel 2 and channel 51 (corresponding to 54 MHz to 698 MHz).

To avoid interference with digital TV broadcasts and other incumbent systems, such as wireless microphone systems, radios that use the TV white spaces (referred to as TV white spaces devices or TVBDs) are required to register and receive a channel map of available channels that may be used for the communications activity of the radio system. Current regulations require these radio systems to register every twenty-four hours. Also, for mobile radios, if the radio moves into a new location, a new registration is required. Other regulations on the radios are present, such as transmitted power limits for different types of radios. Additional information regarding the regulation of TV white spaces may be found in FCC 08-260, Second Report and Order and Memorandum Opinion and Order, Adopted Nov. 4, 2008 and Released Nov. 14, 2008, the entirety of which is incorporated herein by reference. Similar proposals have been made in places other than the United States. For example, Ofcom in the United Kingdom has described access to certain spectrum by cognitive radios in "Digital Dividend: Cognitive—Access Consultation on License-Exempting Cognitive Devices Using Interleaved Spectrum," published Feb. 16, 2009.

To efficiently use licensed spectrum, a network deployed by the licensee may make use of spectrum sharing techniques (also referred to as frequency sharing techniques). Most spectrum sharing techniques are embedded in the physical layer or the media access control (MAC) layer of a radio device's operating protocol. Exemplary types of spectrum sharing include frequency division duplex (FDD) and time division duplex (TDD). More specific exemplary standards for spectrum sharing include code division multiple access (CDMA) and orthogonal frequency division modulation (OFDM).

An example network that may use spectrum sharing is a network deployed by a mobile telephone service provider. Individual radios (e.g., mobile telephones and other supported client devices) in the network may "share" the spectrum by using different spectrum sharing "codes" that are assigned by network host devices. The codes govern when the radios may transmit and receive data and/or the frequency bands that are employed for wireless communications.

SUMMARY

While spectrum sharing has been successfully used for individual networks, there is still a need to improve spectrum allocation to increase the communication capacity of spectrum resources. The present disclosure describes allocating spectrum to more than one radio network where the allocated spectrum for each network overlaps in time, geography and frequency. In addition, the networks share the spectrum by employing spectrum sharing in accordance with a control mechanism to avoid collisions between the transmissions of the networks, and even individual radios within the networks. The spectrum sharing may rely on established spectrum sharing protocols, in which case, a common control mechanism may involve the distribution of spectrum sharing codes between or among the involved networks. Spectrum sharing protocols use spectrum sharing codes to avoid collisions in time and space that otherwise would be treated as interference. Thus, under the disclosed spectrum sharing techniques, the various systems that use overlapping spectrum may avoid interfering with one another.

According to one aspect of the disclosure, a method of coordinating networks to share spectrum in which each network includes a plurality of radio devices that are administered as a unit and in accordance with a spectrum allocation for the group of radio devices includes receiving a spectrum allocation request from one of the networks; matching the spectrum allocation request to available spectrum, the available spectrum overlapping in time, frequency and location with spectrum allocated to another one of the networks; and generating a spectrum allocation and transmitting the spectrum allocation to the requesting network, the spectrum allocation including spectrum sharing control data used by the requesting network to carry out wireless communication using the matched spectrum simultaneously with wireless communications of the another one of the networks.

According to another aspect of the disclosure, a method of conducting radio communications in an environment with plural wireless networks where each network includes a plurality of radio devices that are administered as a unit and in accordance with a spectrum allocation for the group of radio devices includes transmitting a spectrum request to a spectrum management system from one of the networks, the spectrum request including an identification of at least one supported spectrum sharing protocol of radios devices in the requesting network; and receiving a spectrum allocation from the spectrum management system, wherein spectrum defined in the spectrum allocation overlaps in time, frequency and location with spectrum allocated to another one of the networks, and the spectrum allocation includes spectrum sharing control data used by the requesting network to carry out wireless communication simultaneously with wireless communications of the another one of the networks.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

DETAILED DESCRIPTION OF EMBODIMENTS

Figure 1:
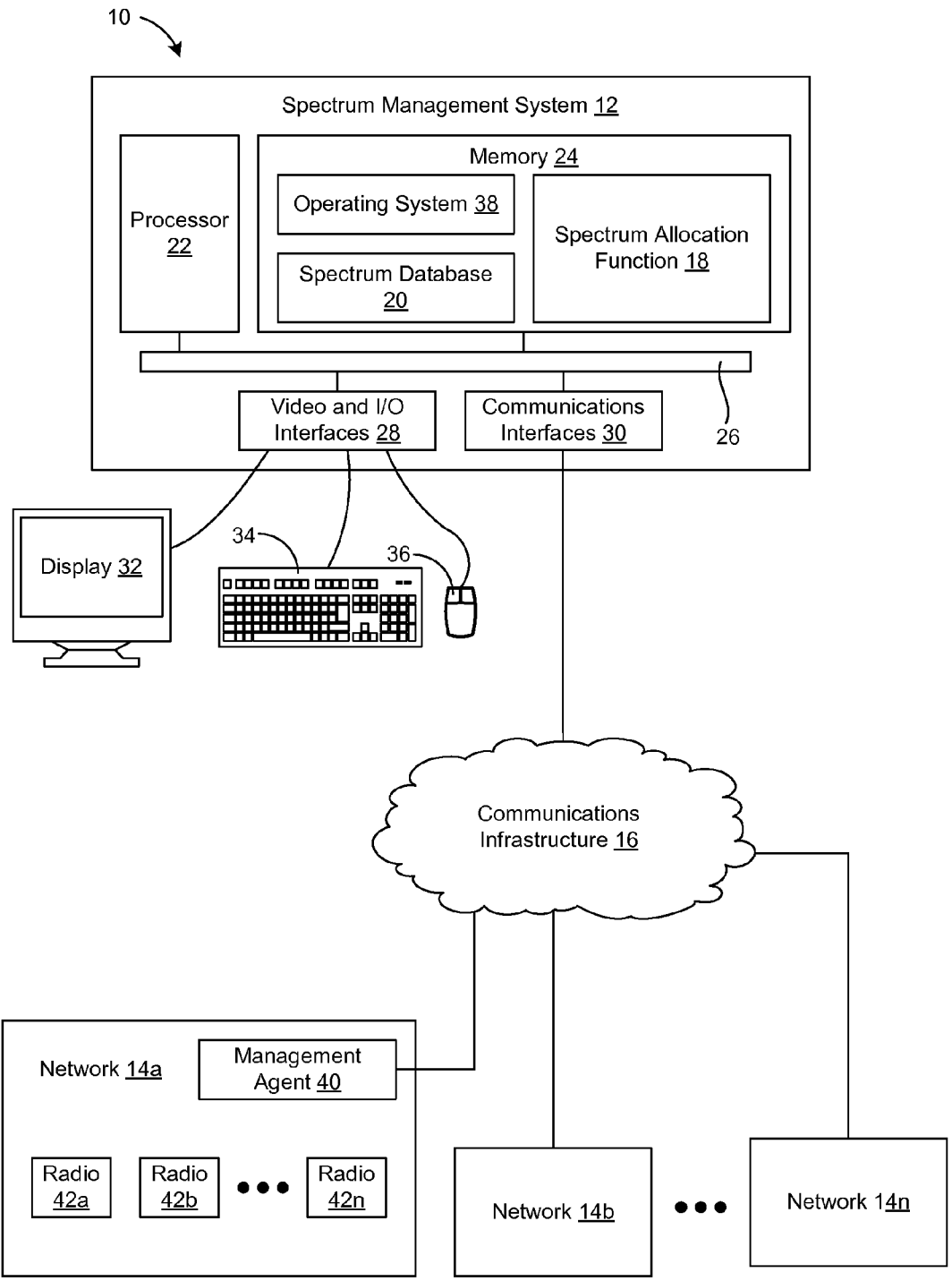
FIG. 1 is a schematic view of an exemplary communication system that includes plural wireless radio networks and an exemplary spectrum management system for overseeing spectrum use by radio devices in the exemplary communication system.

Embodiments will now be described with reference to the drawings, wherein like reference numerals are used to refer to like elements throughout. It will be understood that the figures are not necessarily to scale.

A(1). Wireless Communications Context

Aspects of the disclosed systems and methods are independent of the type or types of radio devices that may use spectrum. As such, the systems and methods may be applied in any operational context for wireless communications, and wireless communications are expressly intended to encompass unidirectional signal transmissions (e.g., broadcasting of a signal for receipt by a device without response) and to encompass bidirectional communications where devices engage in the exchange of signals. The methods and systems may be applied to simple and/or intelligent cognitive radio devices. The methods and systems may be applied to fixed location and/or mobile radio devices. The methods and systems may be applied to licensed and/or unlicensed spectrum. Furthermore, the methods and systems are not specific to modulation schemes, harmonic considerations, frequency bands or channels used by the radio devices, the type of data or information that is transmitted, how the radio devices use received information, and other similar communications considerations. Thus, the systems and methods have application in any suitable environment.

In the case of managing spectrum related to white spaces (e.g., TV white spaces), radio systems with priority to the spectrum, including incumbent radio systems, have spectrum use rights that are superior to secondary spectrum users, such as white space devices (WSDs). The secondary radio systems may use spectrum that is interleaved with spectrum used by priority (or primary) radio systems. A registration system to manage such spectrum use and allocation is described in U.S. patent application Ser. No. 12/423,094 filed Apr. 14, 2009, the disclosure of which is incorporated herein by reference in its entirety. A registration system of this nature may be combined with or coordinate its activity with the spectrum management system that is described in greater detail below.

The disclosed concepts may be applied to other operational scenarios, including the allocation of licensed spectrum. One operational scenario includes a system in which requests or bids for spectrum are matched to available spectrum that is made available by license holders on a spectrum brokerage or exchange. A system that manages spectrum use and allocation in this operational context is described in U.S. patent Ser. No. 12/042,543 filed Mar. 5, 2008, the disclosure of which is incorporated herein by reference in its entirety. In this exemplary context, a spectrum user may be granted a spectrum certificate or other data object that specifies the spectrum that may be used in terms of communications-related information, such as geography, frequency, spectral mask, time, power limits, and spectrum sharing control data as described in greater detail below.

A(2). Network

Many technical resources describe a network as a group of devices that are operatively connected by a communication mechanism. For purposes of this document, the term "network" will be used with greater precision. A "network," for purposes of this document, will be a group of radio devices that are administered as a unit and in accordance with a spectrum allocation for the group of radio devices. The devices in a network may (or may not) belong to a single domain, or may (or may not) have a shared security policy or other attributes. But, the devices forming an individual network will be governed by the network's spectrum allocation and that spectrum allocation has control values for spectrum sharing (e.g., "sharing codes") that are unique to the network. The spectrum sharing control values used by one network will not be used by devices from another network, even though the other network may use alternative spectrum control values for spectrum that overlaps in terms of location, time, and frequency.

B. Communication System

With initial reference to FIG. 1, an exemplary communication system 10 is illustrated. It will be understood that the illustrated and described communication system 10 is intended to include representative components that may take advantage of the techniques and devices that are described in greater detail below. Therefore, the topology of the depicted communication system 10 of FIG. 1 is for description purposes, and may vary from the topology that is shown.

The system 10 may include a spectrum management system 12 that communicates with networks 14 through a communications infrastructure 16. The communications infrastructure 16 may be, for example, the Internet, or may be implemented in another manner.

B(1). Spectrum Management System

The spectrum management system 12 may be a computer-based system that is capable of executing computer applications (e.g., software programs). The spectrum management system 12 may be configured to execute a spectrum allocation function 18. The spectrum management system 12 may store a spectrum database 20 that contains data regarding spectrum availability and that is used by the spectrum allocation function 18. In the illustrated embodiment, the spectrum allocation function 18 and the spectrum database 20 are commonly hosted in the spectrum management system 12. It will be appreciated that the spectrum allocation function 18 and/or the spectrum database 20 may be hosted in a more distributed manner.

The spectrum management system 12 is tasked with making spectrum usage determinations and/or providing spectrum allocation to one or more of the networks 14. A spectrum allocation may be in the form of a channel maps in the case of a network of WSDs or in the form of a spectrum certificate in the case of a network of radios that relies on licensed spectrum.

As indicated, the spectrum management system 12 may be implemented with computer technology. In one embodiment, the spectrum allocation function 18 is embodied as one or more computer programs (e.g., one or more software applications including compilations of executable code). The computer program(s) and/or database 20 may be stored on a computer readable medium, such as a memory in the form of a magnetic, optical or electronic storage device (e.g., hard disk, optical disk, flash memory, etc.).

To execute the function 18, the system 12 may include one or more processors 22 used to execute instructions that carry out a specified logic routine(s). In addition, the system 12 may have a memory 24 for storing data, logic routine instructions, computer programs, files, operating system instructions, and the like. As illustrated, the function 18 and the database 20 may be stored by the memory 24. The memory 24 may comprise several devices, including volatile and non-volatile memory components. Accordingly, the memory 24 may include, for example, random access memory (RAM) for acting as system memory, read-only memory (ROM), a hard disk, a floppy disk, an optical disk (e.g., a CD and a DVD), a tape, a flash device and/or another memory component, plus associated drives, players and/or readers for the memory devices. The processor 22 and the components of the memory 24 may be coupled using a local interface 26. The local interface 26 may be, for example, a data bus with accompanying control bus, a network, or other subsystem.

The system 12 may have various video and input/output (I/O) interfaces 28 as well as one or more communications interfaces 30. The interfaces 28 may be used to operatively couple the system 12 to various peripherals, such as a display 32, a keyboard 34, a mouse 36, and other input and/or output devices. The communications interface 30 may include for example, a modem and/or a network interface card. The communications interface 30 may enable the system 12 to send and receive data signals, voice signals, video signals, and the like to and from other devices, including components of the networks 14, via the communications infrastructure 16.

The memory 24 may store an operating system 38 that is executed by the processor 22 to control the allocation and usage of resources in the system 12, as well as provide basic user interface features. Specifically, the operating system 38 controls the allocation and usage of the memory 24, the processing time of the processor 22 dedicated to various applications being executed by the processor 22, and the peripheral devices, as well as performing other functionality. In this manner, the operating system 38 serves as the foundation on which applications, such as the function 18, depend as is generally known by those with ordinary skill in the art. The operating system 38 also may control much of the user interface environment presented to a user, such as features of the overall graphical user interface (GUI) for the system 12.

In one embodiment, the system 12 may be configured as a server that executes the function 18 to host the below-described spectrum management functions. The spectrum management functions include providing spectrum use determinations to qualified users (e.g., as embodied as the networks 14) so that the users may make use of spectrum for wireless communications.

In the embodiment where spectrum managed by the spectrum management system includes TV white spaces, the system 12 may serve as a registration system that is constructed in accordance with the above-mentioned FCC Report and Order, in accordance with similar regulations found outside the United States, and/or implemented in accordance with the above-mentioned U.S. patent application Ser. No. 12/423, 094. In this embodiment, information included in the database 20 may describe the location, contour, access or use rules (e.g., transmit power limits), and any other pertinent data related to the unlicensed spectrum.

In the case where the system 12 manages licensed spectrum for use by corresponding commission licensees and/or other parties that seek spectrum for wireless communications, the database 20 may include information that describes available licensed spectrum in terms of location, time availability, frequency or spectral mask, the types of network applications supported by the spectrum, and any other relevant data concerning the use of the spectrum.

B(2). Network Configuration

It will be understood that the illustrated and described networks 14 are intended to include representative components that may take advantage of the techniques and devices that are described in greater detail below. Therefore, the topology of the depicted networks 14 of FIG. 1 is for description purposes, and may vary from the topology that is shown.

In the illustrated embodiment, a plurality of networks 14 are illustrated and are labeled as networks 14a through 14n. Components of only a first network 14a are illustrated. It will be understood that the other networks 14 may have similar construction in terms of including components with the functionality described for the components of the first network 14a. For example, the networks each may include a management agent 40 and a plurality of radio devices 42. The radio devices 42 for the first network 14a are labeled radios 42a through 42n. The management agent 40 may form part of one of the radios 42 or may be a separate network management device. Also, each radio 42 may include at least one transceiver for engaging in wireless communications and a controller for managing radio operation. Each radio 42 controller and the management agent 40 may carry out the respective logical functions described in greater detail in the following sections. Therefore, controllers of the radio 42 and/or the management agent 40 may be implemented using, for example, computing technology such as a processor that executes logical instructions (e.g., a software program that embodies the logical functions in the form of code) and a memory that stores the logical instructions and related data.

C. Spectrum Management

Figure 2:
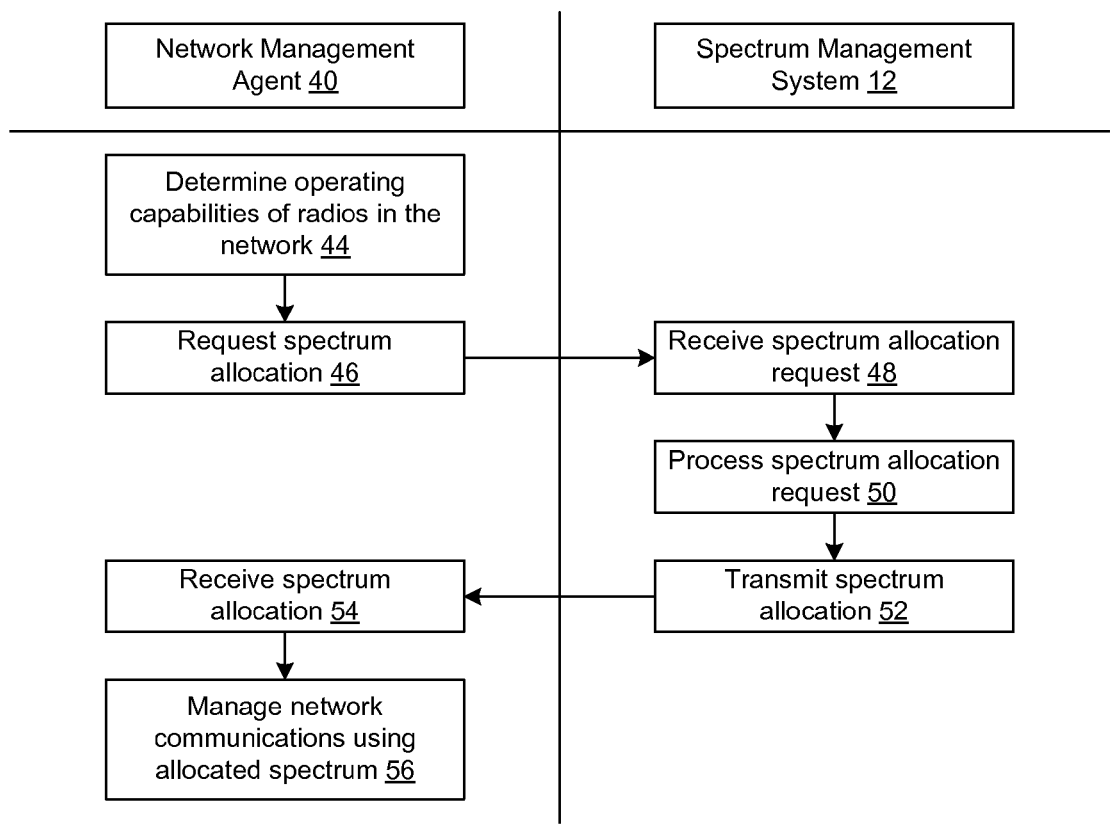
FIG. 2 is an exemplary flowchart representing functional operations carried out by components of the exemplary communication system of FIG. 1.

With additional reference to FIG. 2, illustrated are logical and functional actions taken by one of the networks 14 and the spectrum management system 12 to register the network 14 with the spectrum management system 12 and provide a spectrum allocation to the network 14. The actions of the spectrum management system 12 may be carried out by executing the spectrum allocation function 18 and the actions of the network 14 may be carried out by executing a corresponding program that is executed by the management agent 40. Thus, the flow chart of FIG. 2 may be thought of as depicting steps of corresponding methods carried out respectively by the spectrum management system 12 and the network 14 as represented by the management agent 40. Although FIG. 2 shows a specific order of executing functional blocks, the order of executing the blocks may be changed relative to the order shown. Also, two or more blocks shown in succession may be executed concurrently or with partial concurrence. Certain blocks also may be omitted.

In one embodiment, the described interactions between the management agent 40 and the spectrum management system 12 may be carried out by transmitting appropriate messages over the communications infrastructure 16.

The functional flow may begin in block 44 where the management agent 40 determines the operating capabilities of the radios 42 in the network 14. This information may have be previously acquired and stored in a database that is maintained by the management agent 40 or may be ascertained by polling one or more relevant radio devices 42. The information may include spectrum sharing capabilities and protocols supported by the radios 42. For example, the radios 42 may be capable of operating using CDMA, OFDM, and/or some other protocol. Other radio characteristics may be ascertained, such as possible output power operating levels, possible operating frequencies, and so forth.

In addition to physical radio characteristics, information regarding operating characteristics of the network 14 may be ascertained. Examples of operating characteristics include the type of communications application or purpose for which the network 14 is deployed, a desired amount of throughput, a tolerance level to data packet collisions, and so forth. Other information may include the location of the network 14 in terms of geographic area covered by the network 14 and the time period during which network 14 operation is desired.

Next, in block 46, the management agent 40 transmits a request for spectrum allocation to the spectrum management system 12. The request may include the information about the network 14 that was determined in block 44, including a time period for which spectrum is desired, a geographic identification of the area in which the network is deployed, and the spectrum sharing capabilities (e.g., supported spectrum sharing protocols), among any other pertinent parameters such as application for which the network is deployed, desired throughput capacity, and tolerance for data packet collisions. If the radio devices 42 of the network are TVBDs, the request for spectrum allocation may be in the form of a channel map request and may further include the spectrum sharing capabilities of the network 14.

The request for spectrum allocation may be received by the spectrum management system in block 48 and processed in block 50. Processing of the spectrum allocation request may include matching the desired spectrum needs to available spectrum that meets the needs of the network 14 in terms of location, time, application support, and throughput capacity. Another network 14 may already have a spectrum allocation for or overlapping with the matched spectrum and/or another network 14 may be matched in an overlapping manner with the matched spectrum in the future. Spectrum may "overlap" in terms of some commonality in time, location, and frequency.

Spectrum availability may be determined by searching the spectrum database 20 for spectrum that is not allocated to a network 14 or that may be shared between or among networks 14. In one embodiment, licensed spectrum for allocation may be obtained from a commission licensee that has excess spectrum capacity. Spectrum from a commission licensee may be obtained in the secondary market for spectrum or directly made available to the spectrum management system 12 from the licensee. Other sources of spectrum may include available white space spectrum. In one approach, one or more TV white spaces may be reserved for allocation using the described spectrum sharing techniques. In another approach, the spectrum of a low power television station may be used. In one embodiment, requesting networks 14 may pay for spectrum allocation and any licensee that made spectrum available may be compensated. But payment for spectrum allocations and/or compensation for making spectrum available need not occur to make use of the described spectrum sharing techniques.

In the situation where two or more networks 14 are matched to overlapping spectrum, each of the networks 14 may be permitted to use the matching spectrum and, in block 52, the spectrum management system 12 may transmit a spectrum allocation corresponding to the matched spectrum to the requesting network management agent 40. In order to minimize interference between the networks 14 that match to overlapping spectrum, each network 14 may be allocated different spectrum sharing control data for the spectrum. For instance, if network 14a and network 14b were both allocated spectrum that has at least some commonality in terms of time, location, and frequency, then the network 14a may be assigned a first set of spectrum sharing codes and the network 14b may be assigned a second set of spectrum sharing codes that are different from the spectrum sharing codes in the first set of spectrum sharing codes.

As a result, the spectrum allocation may contain data that allows the network 14 to use allocated spectrum and to control the network 14 from interfering with the communications of other networks 14 and other radio devices outside the network 14. In one embodiment, the spectrum allocation binds the network 14 to use spectrum only in accordance with the spectrum allocation and any other spectrum for which the network 14 is entitled to use (e.g., spectrum for which the network 14 is a commission licensee or unlicensed spectrum). To this end, the spectrum allocation may be in the form of a software data object that specifies one or more communication criteria including one or more of the following: spectrum sharing control data (e.g., one or more spectrum sharing codes that are not assigned to another network 14 for overlapping spectrum); a time window in which the spectrum allocation is valid; a frequency band, spectral mask, or other frequency identifying information (e.g., a center frequency and channel width); a transmit power limit; a geographic identification of the area in which the spectrum allocation is valid; and so forth.

In the case of a network that relies on white spaces (e.g., TV white spaces), the spectrum allocation take an alternative form. For instance, in this situation the spectrum allocation may be in the form of a channel map plus spectrum sharing control data (e.g., spectrum sharing codes) for one or more of the channels that are identified as being available to the network 14 in the channel map.

In one embodiment, the spectrum management system 12 is configured to allocate overlapping spectrum and respective spectrum sharing control data that permits two or more networks 14 to share the overlapping spectrum in a manner that groups networks 14 in an organized manner according to network features. In one embodiment, the spectrum allocations are made so that networks 14 that share a block of overlapping spectrum operate using the same spectrum sharing protocol. Other features that may be used to group networks for spectrum sharing include the types of radio device 42, the types of communications applications of the networks, transmit power considerations of the networks, modulation schemes, and so forth. In this manner, the spectrum management system 12 may normalize the spectrum sharing technique and spectrum sharing control data in a spectrum allocation to the capability of the "least" capable radio device in all of the networks 14 under consideration to share overlapping spectrum. This approach also allows spectrum from different bands and/or diverse commission licensees to be treated in an interchangeable manner. Although this approach may not maximize communication efficiency under relevant regulatory constraints, the approach is manageable and usable by diverse radio types.

In one embodiment, plural pools of spectrum may be established. Each pool may be used to support different types of radio device capabilities. Spectrum may then be allocated among the networks 14 so that all radios 42 using spectrum from a pool can "coexist" by virtue of common operating capability of the radio devices. The use of plural spectrum pools may assist in allocating spectrum to radios with diverse capabilities while maintaining the above-described normalization among radios that share overlapping spectrum. Each pool of spectrum may be separately allocated to radios that use the spectrum in similar enough fashion to avoid interference between the respective networks. For instance, it is probably impractical to allocate overlapping spectrum for shared use between a broadcast network and a two-way network, or between a network that relies on FDD and a network that relies upon TDD. Instead, the networks may be categorized and each network may be allocated spectrum from a spectrum pool corresponding to the network category. In this embodiment, each network associated with a pool will have the ability to share spectrum with any other network associated with the pool with minimal or no interference between networks. It is possible that a network may be able to use spectrum from more than one pool in this manner. Under the described techniques, radios 42 in the networks 14 may be certified to operate under any applicable software defined radio (SDR) rules or regulations for the spectrum allocated to the network 14, but otherwise there is no or minimal modifications to the individual radios 42 to operate using spectrum that is allocated under the described techniques.

The networks 14 that share spectrum need not share the spectrum equally. Time division "slots", frequency division "slots", or other spectrum sharing "slots" may be equally divided among the networks 14 that share overlapping spectrum or may be unequally divided among the networks 14 that share overlapping spectrum. For example, if there are two networks 14 that share spectrum and there are ten available spectrum sharing codes for the spectrum, then one of the networks may be allocated more than five of the sharing codes and the other network may be allocated less than five of the sharing codes. In one embodiment, the number of codes allocated to a network 14 may relate to the desired throughput for the network 14. In another embodiment, the number of sharing codes allocated to each network 14 may depend on the respective throughput needs of the networks 14. Also, not all of the available codes need to be allocated. Unallocated sharing codes may be reserved for a future requesting network or additional capacity requested by an existing network. In addition, out-of-band emissions (including intermodulation and harmonic issues) may be controlled using spreading codes that are allocated to the networks 14 by the spectrum management system 12.

Other manners of dividing the shared spectrum may be employed. For instance, some spectrum sharing codes may be made more preferred than others. More preferred codes may include, for example, completely orthogonal codes and less preferred codes may include, for example, almost orthogonal codes. A network 14 that is intolerant of data collisions may receive completely orthogonal codes and a network 14 that is tolerant of data collisions may receive completely orthogonal codes, almost orthogonal codes, or a mix of completely orthogonal and almost orthogonal codes.

In the event that allocated spectrum is used by or may be used in the future by public safety personnel (e.g., emergency responders) or other priority user, then preferred spectrum sharing codes may be reserved for the network operated by a corresponding governmental organization or user. In addition, a spectrum allocation may be revoked in full or in part, or may be modified, to accommodate a newly requesting network or control spectrum use by an existing network.

With continuing reference to the figures, the spectrum allocation transmitted by the spectrum management system in block 52 may be received by the requesting network management agent 40 in block 54. Then, in block 56, the network management agent 40 may configure the radios 42 in the network 14 to operate in accordance with the received spectrum allocation. Once configured, the radios 42 may carry out wireless communications.

As will be appreciated, the spectrum management system 12 provides a centralized authority for distributing spectrum sharing control data so that multiple networks 14 may use overlapping spectrum for simultaneous wireless communications with minimum interference between networks 14. Diverse operating criteria and regulatory constraints of plural networks may be satisfied under the disclosed techniques, and these techniques may be used to support a mix of commercial and government applications.

E. Conclusion

Although certain embodiments have been shown and described, it is understood that equivalents and modifications falling within the scope of the appended claims will occur to others who are skilled in the art upon the reading and understanding of this specification.

What is claimed is:

1. A method of coordinating two or more networks to share spectrum, comprising:
receiving, with a spectrum management server, a spectrum allocation request from one of the networks, the spectrum management server having previously allocated spectrum by generating and transmitting a first spectrum allocation to another one of the networks for use in wireless communications, the first spectrum allocation including a first set of spectrum sharing spreading codes;
matching, with the spectrum management server, the spectrum allocation request to available spectrum to identify matched spectrum, the matched spectrum comprising spectrum that is the same in each of time, frequency and location as spectrum allocated in the first spectrum allocation and used by the another one of the networks for wireless communications; and generating, with the spectrum management server, a second spectrum allocation and transmitting the second spectrum allocation to the requesting network, the second spectrum allocation including the spectrum that is the same in each of time, frequency and location and including a second set of spectrum sharing spreading codes different than the spreading codes in the first set of spectrum sharing spreading codes, the second set of spectrum sharing spreading codes used by the requesting network to carry out wireless communication using the spectrum that is the same in each of time, frequency and location and without interference to the wireless communications of the another one of the networks, the another one of the networks and the requesting network being individual networks that each respectively include a plurality of radio devices that are administered as a unit and communicate with each other within the network in accordance with the spectrum allocation for the respective network.

2. The method of claim 1, wherein the spectrum management server allocates spreading codes so that the shared spectrum is divided unequally between the requesting network and the another one of the networks.

3. The method of claim 2, wherein the shared spectrum is divided by relative throughput needs of the networks.

4. The method of claim 2, wherein the shared spectrum is divided by relative priority of the networks.

5. The method of claim 1, wherein the first spectrum allocation and the second spectrum allocation respectively include a channel map of spectrum white spaces.

6. The method of claim 1, wherein the first spectrum allocation and the second spectrum allocation respectively include spectrum that is licensed from a governmental entity by a licensee and made available for sharing by the licensee.

7. The method of claim 1, wherein the matched spectrum is from one of plural spectrum pools, and each pool is associated with plural networks that each have an ability to share spectrum with any other network associated with the pool with minimal or no interference between the networks.

8. A spectrum management server, comprising:
a communications interface over which the spectrum management server communicates with a first network and a second network, the first and second networks being individual networks that respectively include a plurality of radio devices that are administered as a unit and communicate with each other within the network in accordance with a spectrum allocation for the respective network; and
a processor that executes logical instructions to:
generate and transmit a first spectrum allocation including a first set of spectrum sharing spreading codes to the first network; and
in response to a spectrum allocation request from the second network, generate and transmit a second spectrum allocation including a second set of spectrum sharing spreading codes to the second network, the first and the second spectrum allocations including spectrum that is the same in each of time, frequency and location but where the spreading codes of the first set are unique relative to the spreading codes of the second set so that wireless communications of the second network carried out using the second spectrum allocation do not interfere with wireless communications of the first network carried out using the spectrum that is the same in each of time, frequency and location and in accordance with the first spectrum allocation.

* * * * *